(12) United States Patent
Oya et al.

(10) Patent No.: US 10,605,146 B2
(45) Date of Patent: Mar. 31, 2020

(54) EXHAUST MECHANISM FOR VEHICLE

(71) Applicant: TOYOTA JIDOSHA KABUSHIKI KAISHA, Toyota-shi, Aichi-ken (JP)

(72) Inventors: Takeshi Oya, Nisshin (JP); Hideki Fukushima, Okazaki (JP); Takatoshi Sugihara, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 330 days.

(21) Appl. No.: 15/833,892

(22) Filed: Dec. 6, 2017

(65) Prior Publication Data
US 2018/0179943 A1  Jun. 28, 2018

(30) Foreign Application Priority Data

Dec. 26, 2016 (JP) .................. 2016-251554

(51) Int. Cl.
*F01N 13/08* (2010.01)
*F01N 1/08* (2006.01)
*F01N 3/00* (2006.01)
*F01N 13/18* (2010.01)

(52) U.S. Cl.
CPC ........... *F01N 13/082* (2013.01); *F01N 1/085* (2013.01); *F01N 3/005* (2013.01); *F01N 13/08* (2013.01); *F01N 13/1805* (2013.01); *F01N 2240/20* (2013.01); *F01N 2470/30* (2013.01); *Y02T 10/20* (2013.01)

(58) Field of Classification Search
CPC ........ F01N 13/082; F01N 1/085; F01N 3/005; F01N 13/08; F01N 13/1805; F01N 2240/20; F01N 2470/30

USPC ......................................... 181/227, 228, 244
See application file for complete search history.

(56) References Cited

U.S. PATENT DOCUMENTS

| | | | | |
|---|---|---|---|---|
| 5,121,602 A * | 6/1992 | McCorvey | .............. | F01N 3/005 261/84 |
| 6,591,935 B1 * | 7/2003 | Petley | ..................... | F01N 13/02 180/309 |
| 8,001,770 B2 * | 8/2011 | Wirth | ....................... | F01N 3/005 60/286 |
| 8,136,627 B2 * | 3/2012 | Matsueda | ............... | F01N 1/006 181/232 |
| 9,228,475 B2 * | 1/2016 | Mukai | ..................... | F01N 13/02 |
| 9,688,314 B2 * | 6/2017 | Ajisaka | .................. | B62D 25/20 |
| 9,719,404 B2 * | 8/2017 | Yamamoto | .............. | F01N 13/18 |

(Continued)

FOREIGN PATENT DOCUMENTS

JP        2015-158149 A        9/2015

*Primary Examiner* — Jeremy A Luks
(74) *Attorney, Agent, or Firm* — Oliff PLC (57) ABSTRACT

A channel cross-sectional area of a lower side channel is set to be smaller than an upper side channel in a predetermined region and greater than the upper side channel on an upstream side and a downstream side of the predetermined region. Accordingly, an ability to drain condensed water is improved by guiding exhaust gas to the lower side channel and facilitating an increase in a flow rate of the exhaust gas guided to the lower side channel. The exhaust gas flowing in the upper side channel and the lower side channel receives flow resistance from a partition member from an extending portion to a front of a main muffler. Thus, the ability to drain the condensed water can be improved with reduction in pressure loss generated in the exhaust gas.

6 Claims, 8 Drawing Sheets

(56) References Cited

U.S. PATENT DOCUMENTS

| | | | |
|---|---|---|---|
| 10,422,259 B2* | 9/2019 | Sawai | F01N 13/08 |
| 2009/0288912 A1* | 11/2009 | Yamaguchi | B60K 13/04 |
| | | | 181/227 |
| 2018/0058282 A1* | 3/2018 | Murata | F01N 3/005 |
| 2018/0128415 A1* | 5/2018 | Wakatsuki | F01N 13/08 |
| 2018/0179931 A1* | 6/2018 | Wakatsuki | F01N 1/08 |
| 2019/0085744 A1* | 3/2019 | Kishikawa | F01N 1/089 |

* cited by examiner

EXHAUST MECHANISM FOR VEHICLE

INCORPORATION BY REFERENCE

The disclosure of Japanese Patent Application No. 2016-251554 filed on Dec. 26, 2016 including the specification, drawings and abstract is incorporated herein by reference in its entirety.

BACKGROUND

1. Technical Field

The disclosure relates to an exhaust mechanism for a vehicle.

2. Description of Related Art

An exhaust pipe structure that includes an exhaust pipe and a muffler is disclosed in Japanese Unexamined Patent Application Publication No. 2015-158149 (JP 2015-158149 A). The exhaust pipe causes exhaust gas from an engine to flow rearward of a vehicle. The rear end of the exhaust pipe is disposed inside the muffler, and the muffler communicates with the rear end of the exhaust pipe. The exhaust pipe has an extending portion and an upslope portion. The extending portion extends in a vehicle front-rear direction. The upslope portion communicates with the rear end of the extending portion and has an upslope rearward of the vehicle.

In the exhaust pipe structure, a partition member partitions the inside of the exhaust pipe into an upper side and a lower side from the extending portion to the rear end of the exhaust pipe. Accordingly, an exhaust path is formed on the upper side of the exhaust pipe, and a drain path that discharges condensed water generated by condensation of water vapor included in the exhaust gas is formed on the lower side of the exhaust pipe.

SUMMARY

In the exhaust pipe structure, when the engine is rotated at a slow speed, the exhaust path is placed into a closed state by an on-off valve, and the exhaust gas flows in the drain path. Accordingly, the channel cross-sectional area of the exhaust pipe is reduced by half. Consequently, the flow rate of the exhaust gas is increased, and condensed water is discharged to the muffler through the drain path.

In the exhaust pipe structure in JP 2015-158149 A, the partition member is disposed from the extending portion of the exhaust pipe to the rear end of the exhaust pipe disposed inside the muffler. Accordingly, the exhaust gas flowing in the exhaust pipe receives flow resistance from the partition member in the path reaching the inside of the muffler from the extending portion of the exhaust pipe. Thus, a large pressure loss is generated in the exhaust gas.

The present disclosure improves an ability to drain condensed water with reduction in pressure loss generated in exhaust gas.

An aspect of the present disclosure relates to an exhaust mechanism for a vehicle. The exhaust mechanism includes an exhaust pipe, a muffler, and a partition member. The exhaust pipe includes an extending portion and an upslope portion and is configured to cause exhaust gas from an engine to flow to a rear side of the vehicle. The extending portion extends in a front-rear direction of the vehicle. The upslope portion communicates with one end of the extending portion on the rear side of the vehicle and has an upslope toward the rear side of the vehicle. The muffler communicates with one end of the exhaust pipe on the rear side of the vehicle and is configured such that the exhaust gas flows into the muffler from the exhaust pipe. The partition member is disposed inside the extending portion and inside the upslope portion. The partition member partitions the inside of the extending portion and the inside of the upslope portion into an upper side and a lower side to provide an upper side channel and a lower side channel inside the extending portion and inside the upslope portion. The partition member is disposed such that a channel cross-sectional area of the lower side channel is smaller than a channel cross-sectional area of the upper side channel in a predetermined region of the extending portion, and that the channel cross-sectional area of the lower side channel is greater than the channel cross-sectional area of the upper side channel on an upstream side of the predetermined region and a downstream side of the predetermined region.

With the configuration, the channel cross-sectional area of the upper side channel is greater than the channel cross-sectional area of the lower side channel in the predetermined region of the extending portion and is smaller than the channel cross-sectional area of the lower side channel on the upstream side of the predetermined region and the downstream side of the predetermined region. Thus, the exhaust gas from the engine is unlikely to flow into the upper side channel and is guided to the lower side channel.

For example, when water vapor included in the exhaust gas flowing in the exhaust pipe is condensed by a decrease in temperature or the like while flowing in the exhaust pipe, condensed water is generated within the exhaust pipe, and the condensed water may pool in the exhaust pipe.

When the condensed water pools within the lower side channel in the rear end portion of the extending portion, the cross-sectional area of the lower side channel is decreased, and the flow rate of the exhaust gas guided to the lower side channel is increased by Bernoulli's principle. In the configuration, since the channel cross-sectional area of the lower side channel is smaller than the upper side channel in the predetermined region of the extending portion, the flow rate of the exhaust gas guided to the lower side channel is likely to be increased.

When the flow rate of the exhaust gas guided to the lower side channel is increased, a negative pressure is generated within the lower side channel, and the surface of the condensed water rises. The rise in the surface of the condensed water forms a water membrane that closes the lower side channel, and the exhaust pressure of the exhaust gas is instantaneously increased. The increase in the exhaust pressure of the exhaust gas can drain the condensed water in the exhaust pipe along with the water membrane at once.

The configuration improves the ability to drain the condensed water by guiding the exhaust gas to the lower side channel and facilitating an increase in the flow rate of the exhaust gas guided to the lower side channel.

With the configuration, the exhaust gas flowing in the upper side channel and the lower side channel receives flow resistance from the partition member from the extending portion to the front of the muffler. Accordingly, the configuration has less flow resistance than a structure in which the exhaust gas receives flow resistance from the partition member in a path reaching the inside of the muffler from the extending portion of the exhaust pipe (refer to JP 2015-158149 A).

Accordingly, the configuration can improve the ability to drain the condensed water with reduction in pressure loss generated in the exhaust gas.

In the exhaust mechanism for the vehicle, a first width may be smaller than a second width, the first width is a width of the partition member on the upstream side of the predetermined region and the downstream side of the predetermined region. The second width may be a width of the partition member in the predetermined region. The first width and the second width may be widths in the width direction of the vehicle.

The configuration enables easy formation of a structure in which the channel cross-sectional area of the lower side channel is smaller than the upper side channel in the predetermined region of the extending portion and is greater than the upper side channel on the upstream side of the predetermined region and the downstream side of the predetermined region.

In the exhaust mechanism for the vehicle, a bottom of a rear end portion of the extending portion may be disposed in a position on a lower side of the vehicle from a bottom of the extending portion on an upstream side of the rear end portion.

With the configuration, since the bottom of the rear end portion of the extending portion is disposed in a position on the lower side of the vehicle from the bottom of an upstream side part of the rear end portion, the condensed water is likely to pool in the rear end portion further than the upstream side part.

Thus, in the rear end portion, the cross-sectional area of the lower side channel is likely to be decreased, and the flow rate of the exhaust gas guided to the lower side channel is likely to be increased. Accordingly, the ability to drain the condensed water can be improved.

In the exhaust mechanism for the vehicle, the partition member may include a bottom portion disposed in the extending portion, a first inclined portion having an upslope toward a front side of the vehicle from one end of the bottom portion on the front side of the vehicle, and a second inclined portion having an upslope toward the rear side of the vehicle from one end of the bottom portion on the rear side of the vehicle.

With the configuration, the exhaust gas flowing in the lower side channel of the exhaust pipe flows along the lower surfaces of the first inclined portion, the bottom portion, and the second inclined portion. Since the first inclined portion has an upslope toward the front side of the vehicle from the front end of the bottom portion, the exhaust gas flowing in the lower side channel flows along the slope of the first inclined portion. Accordingly, the flow resistance received by the exhaust gas is reduced further than a structure having, instead of the first inclined portion, a standing portion that vertically stands upward of the vehicle from the front end of the bottom portion. The pressure loss generated in the exhaust gas can be reduced.

The exhaust gas flowing in the upper side channel of the exhaust pipe flows along the upper surfaces of the first inclined portion, the bottom portion, and the second inclined portion. Since the second inclined portion has an upslope toward the rear side of the vehicle from the rear end of the bottom portion, the exhaust gas flowing in the upper side channel flows along the slope of the second inclined portion. Accordingly, the flow resistance received by the exhaust gas is reduced further than a structure having, instead of the second inclined portion, a standing portion that vertically stands upward of the vehicle from the rear end of the bottom portion. The pressure loss generated in the exhaust gas can be reduced.

In the exhaust mechanism for the vehicle, a hole that causes water in the upper side channel to flow to the lower side channel may be formed in the second inclined portion.

The configuration can cause the water in the upper side channel to flow to the lower side channel through the hole formed in the second inclined portion. Thus, even when the condensed water flows into the upper side channel, the condensed water is unlikely to pool in the upper side channel. Accordingly, blockage of the upper side channel by the condensed water is reduced.

In the exhaust mechanism for the vehicle, the extending portion may be disposed below a floor panel of the vehicle.

The structure of the present disclosure has an advantageous effect of being able to provide an exhaust mechanism that improves the ability to drain condensed water with reduction in pressure loss generated in exhaust gas.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, one example of an embodiment according to the present disclosure will be described based on the drawings. An arrow RR, an arrow UP, and an arrow RH that are appropriately illustrated in each drawing respectively indicate a vehicle rear side, a vehicle upper side, and a vehicle right side. Hereinafter, a vehicle front-rear direction and a vehicle up-down direction may be simply represented as a front-rear direction and an up-down direction respectively.

A "vehicle side view" used in the following description refers to a view seen from a first side toward a second side in a vehicle width direction and includes a view seen through a part of components. A "vehicle plan view" used in the following description refers to a view seen from the vehicle upper side toward the vehicle lower side and includes a view seen through a part of components.

First, a configuration of an exhaust mechanism 10 according to the present embodiment will be described.

Figure 1:
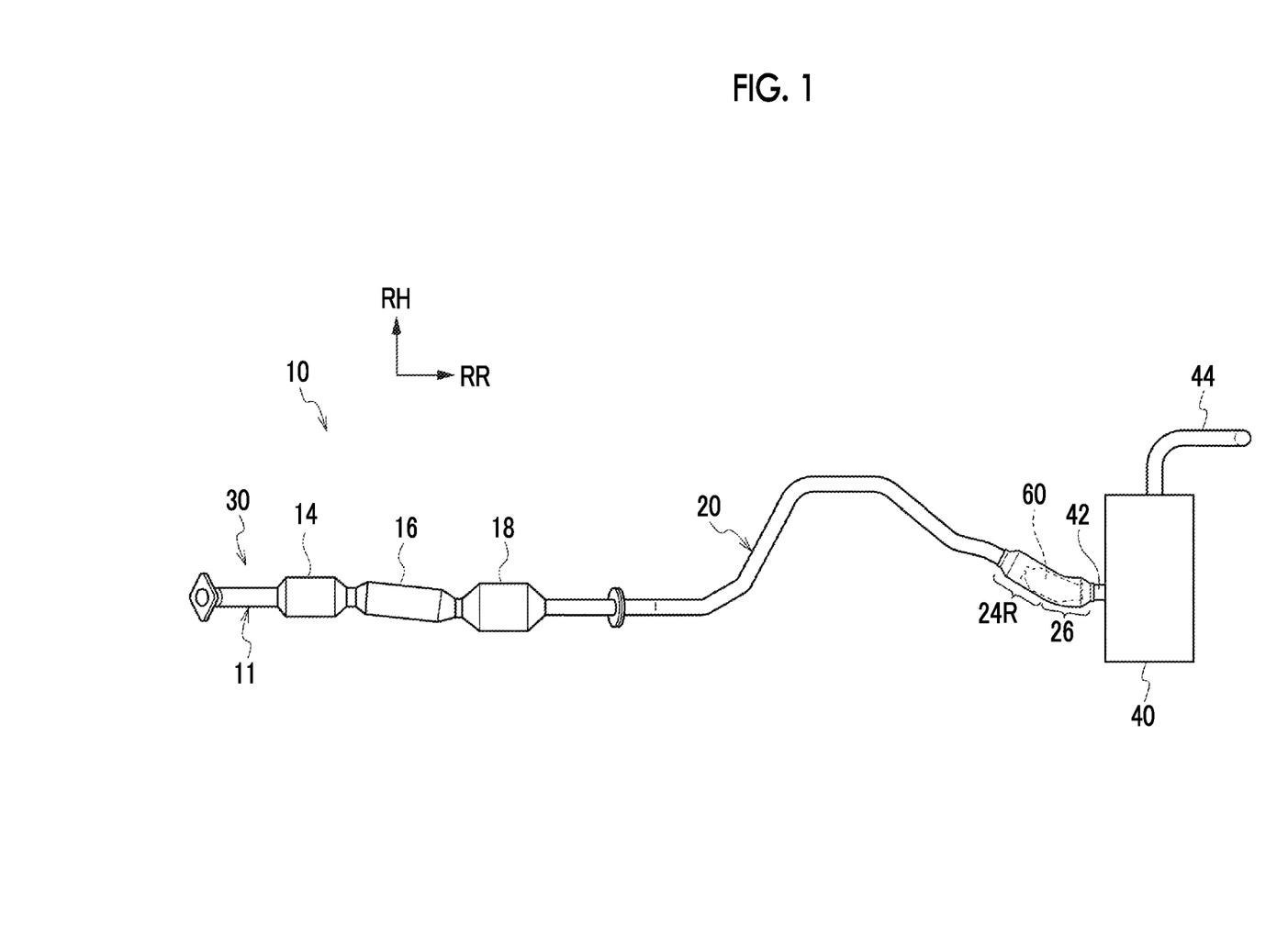
FIG. 1 is a plan view illustrating an exhaust mechanism according to the present embodiment.
Figure 2:
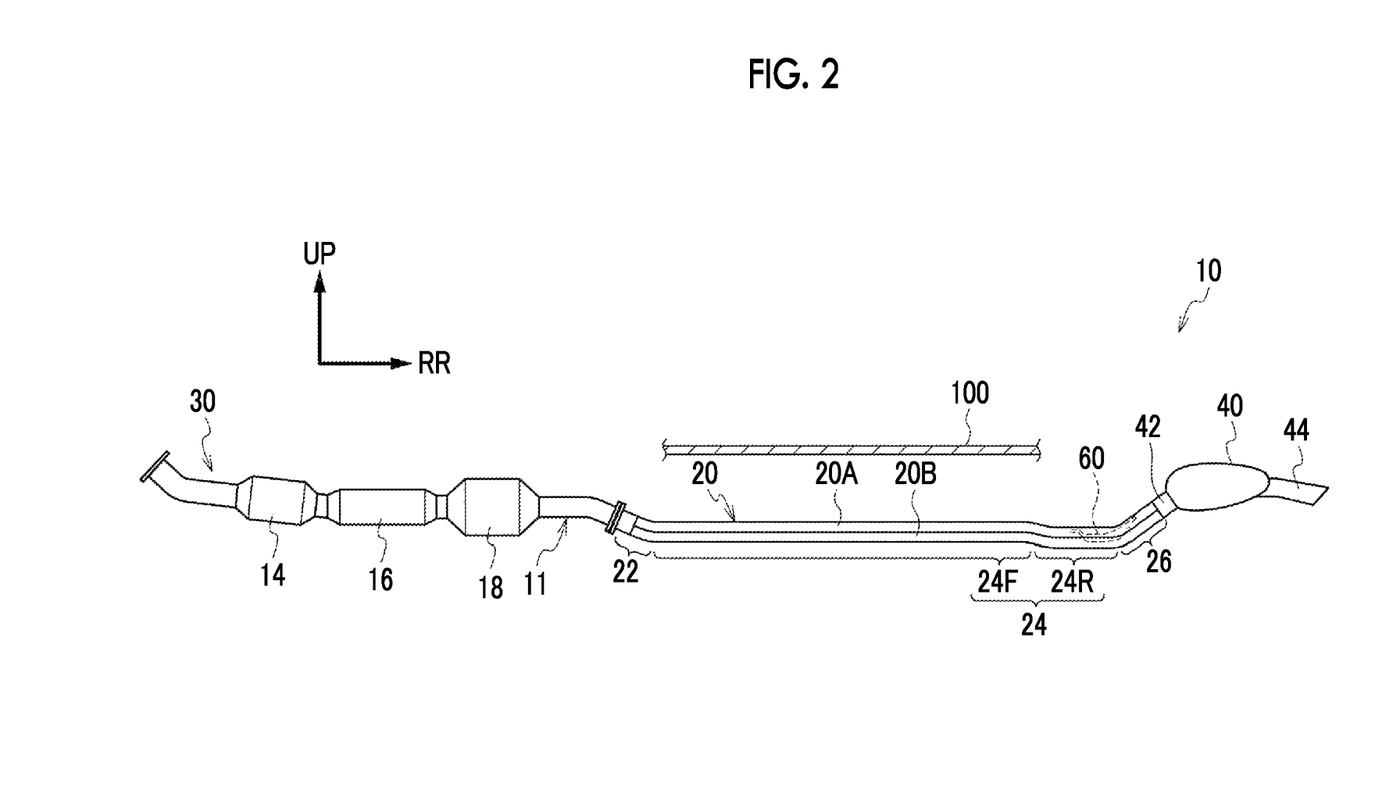
FIG. 2 is a side view illustrating the exhaust mechanism according to the present embodiment.

FIG. 1 is a plan view illustrating the exhaust mechanism 10. FIG. 2 is a side view illustrating the exhaust mechanism 10. Each drawing including FIG. 1 and FIG. 2 schematically illustrates a structure in order to facilitate understanding of the exhaust mechanism 10 according to the present embodiment.

The exhaust mechanism 10 is a pipe structure that discharges exhaust gas to the atmosphere (outside a vehicle). The exhaust gas is discharged from an engine (not illustrated) of the vehicle such as an automobile. Specifically, as illustrated in FIG. 1 and FIG. 2, the exhaust mechanism 10 has an exhaust pipe 30, a main muffler 40 (one example of a muffler), an outlet pipe 44, and a partition member 60. The exhaust pipe 30 has a first exhaust pipe 11, a second exhaust pipe 20, and an inlet pipe 42.

As illustrated in FIG. 1 and FIG. 2, the first exhaust pipe 11 is a pipe that extends in the vehicle front-rear direction. The front end of the first exhaust pipe 11 is connected to the engine (not illustrated). Accordingly, the exhaust gas from the engine flows from the front end of the first exhaust pipe 11 and flows to the vehicle rear side (to the rear end of the first exhaust pipe 11).

A catalytic converter 14, an exhaust heat collector 16, and a sub-muffler 18 are disposed in the first exhaust pipe 11 in this order from a vehicle front side. The catalytic converter 14 functions to remove a specific substance from the exhaust gas passing through the catalytic converter 14 and clean the exhaust gas.

The exhaust heat collector 16 functions to collect and reuse the heat of the exhaust gas. The sub-muffler 18 functions to reduce exhaust sound of the exhaust gas.

As illustrated in FIG. 2, the second exhaust pipe 20 has an extending portion 24, a front portion 22, and an upslope portion 26. The extending portion 24 extends in the vehicle front-rear direction in the vehicle side view. The front end of the extending portion 24 communicates with the rear end of the front portion 22. The front portion 22 has an upslope forward of the vehicle. The rear end of the extending portion 24 communicates with the front end of the upslope portion 26. The upslope portion 26 has an upslope rearward of the vehicle. The second exhaust pipe 20 including the extending portion 24 is disposed below a floor panel 100 of the vehicle.

The front end of the front portion 22 is connected to the rear end of the first exhaust pipe 11. Accordingly, the exhaust gas from the first exhaust pipe 11 flows from the front end of the front portion 22 and flows to the vehicle rear side (to the rear end of the upslope portion 26).

Figure 6:
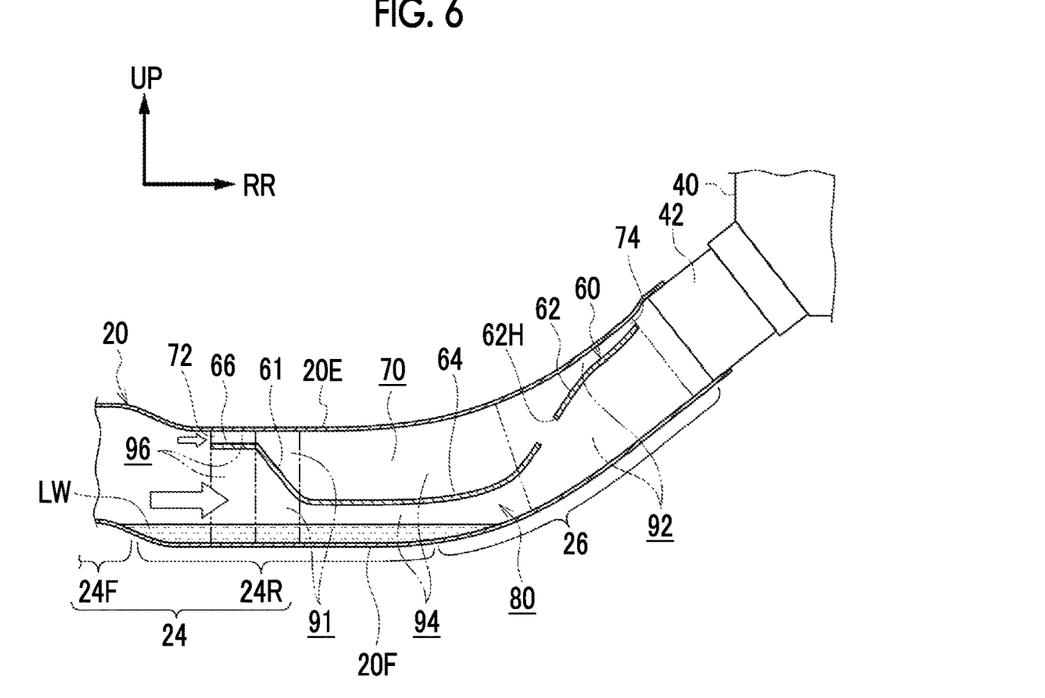
FIG. 6 is a side sectional view illustrating a state in which condensed water pools in a lower side channel in the exhaust mechanism according to the present embodiment.

The bottom of a rear end portion 24R of the extending portion 24 is disposed in a position on the vehicle lower side from the bottom of a front side part 24F (one example of an upstream side part) with respect to the rear end portion 24R. That is, the rear end portion 24R is a recessed part that is recessed downward below the front side part 24F. Accordingly, as illustrated in FIG. 6, condensed water LW generated by condensation of water vapor included in the exhaust gas is likely to pool in the rear end portion 24R. The front side part 24F extends in an approximately horizontal direction in the vehicle side view.

In the present embodiment, as illustrated in FIG. 1, a part of the second exhaust pipe 20 bends toward one side (for example, the vehicle right side) in the vehicle width direction in the vehicle plan view. The extending portion 24 may have any shape in the vehicle plan view, provided that the extending portion 24 extends in the vehicle front-rear direction in the vehicle side view. The upslope portion 26 may have any shape in the vehicle plan view, provided that the upslope portion 26 has an upslope toward the vehicle rear side.

As illustrated in FIG. 1, the diameter of the part of the second exhaust pipe 20 from the rear end portion 24R of the extending portion 24 to the upslope portion 26 is increased further than the other part in, for example, the vehicle width direction. By increasing the diameter of the second exhaust pipe 20, the capacity of causing the condensed water LW (refer to FIG. 6) to pool is increased.

As illustrated in FIG. 2, the second exhaust pipe 20 is formed by joining semi-cylinders 20A, 20B of an approximately semi-cylindrical shape that are disposed above and below each other.

As illustrated in FIG. 2, the main muffler 40 is disposed behind and above the second exhaust pipe 20 in the vehicle front-rear direction. The rear end of the inlet pipe 42 is disposed inside the main muffler 40, and the rear end communicates with the main muffler 40.

The front end of the inlet pipe 42 extends to the vehicle front side from the main muffler 40. The front end of the inlet pipe 42 communicates with the rear end of the upslope portion 26 of the second exhaust pipe 20. Accordingly, the exhaust gas flows into the main muffler 40 through the inlet pipe 42 from the second exhaust pipe 20. The main muffler 40 functions to reduce exhaust sound of the exhaust gas flowing into the main muffler 40.

As illustrated in FIG. 1, the outlet pipe 44 extends to the vehicle right side from the main muffler 40 and is curved to the vehicle rear side. The outlet pipe 44 discharges the exhaust gas to the atmosphere from the main muffler 40.

Figure 3:
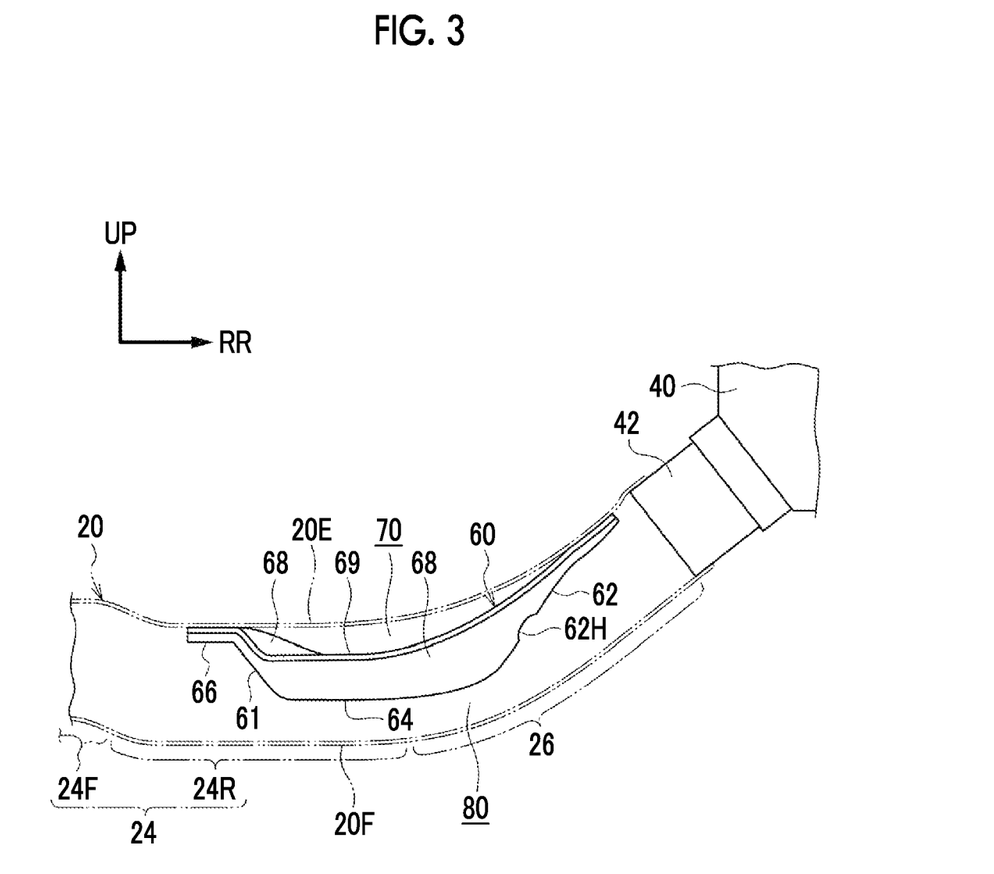
FIG. 3 is a side view illustrating a partition member according to the present embodiment.

As illustrated in FIG. 2 and FIG. 3, the partition member 60 is disposed inside the second exhaust pipe 20. Specifically, the partition member 60 is disposed from the extending portion 24 to the front of the main muffler 40 in the second exhaust pipe 20. The "front of the main muffler 40" means a position before the main muffler 40 in the vehicle front-rear direction (upstream side) and behind the extending portion 24 in the vehicle front-rear direction (downstream side).

Figure 4:
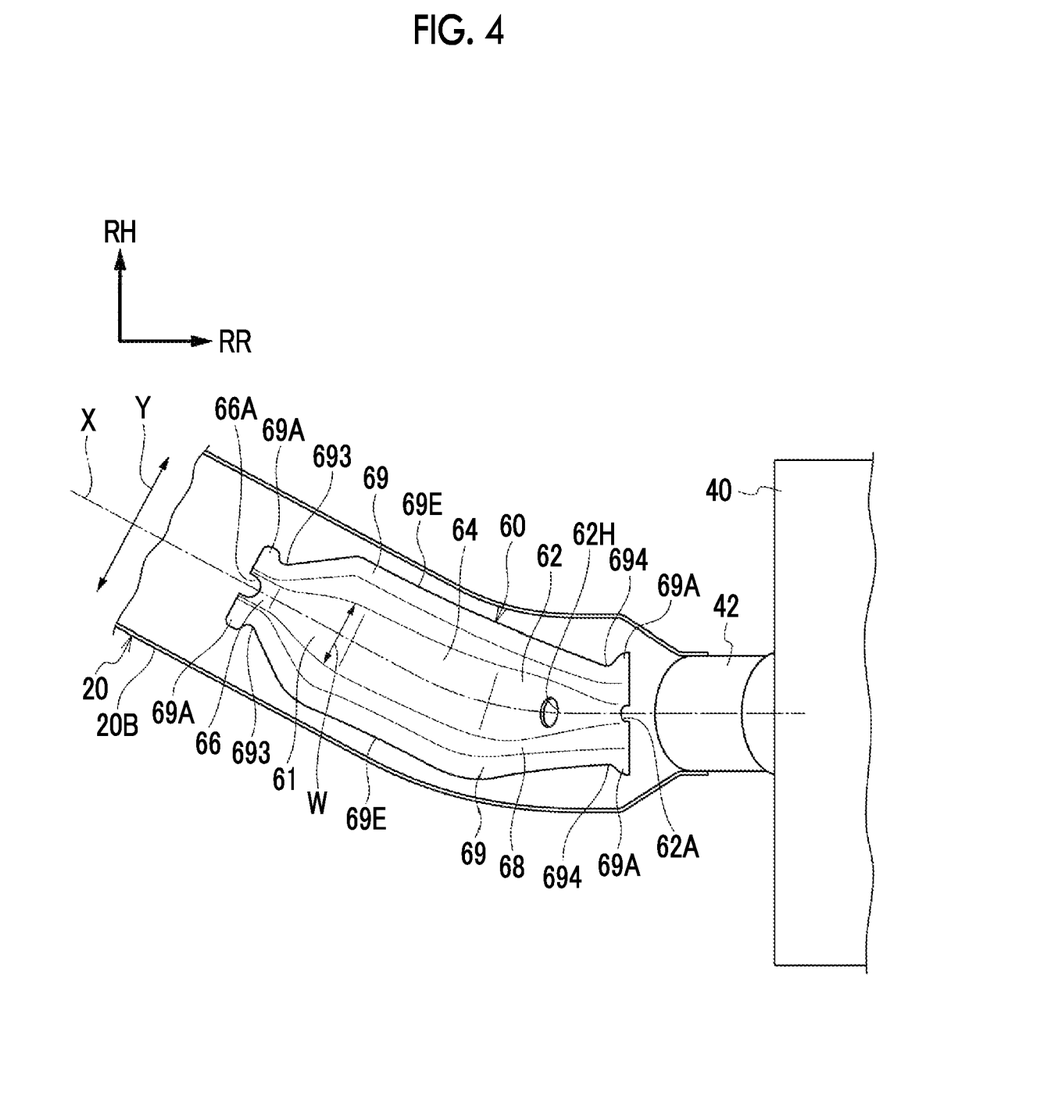
FIG. 4 is a plan view illustrating the partition member according to the present embodiment.
Figure 5:
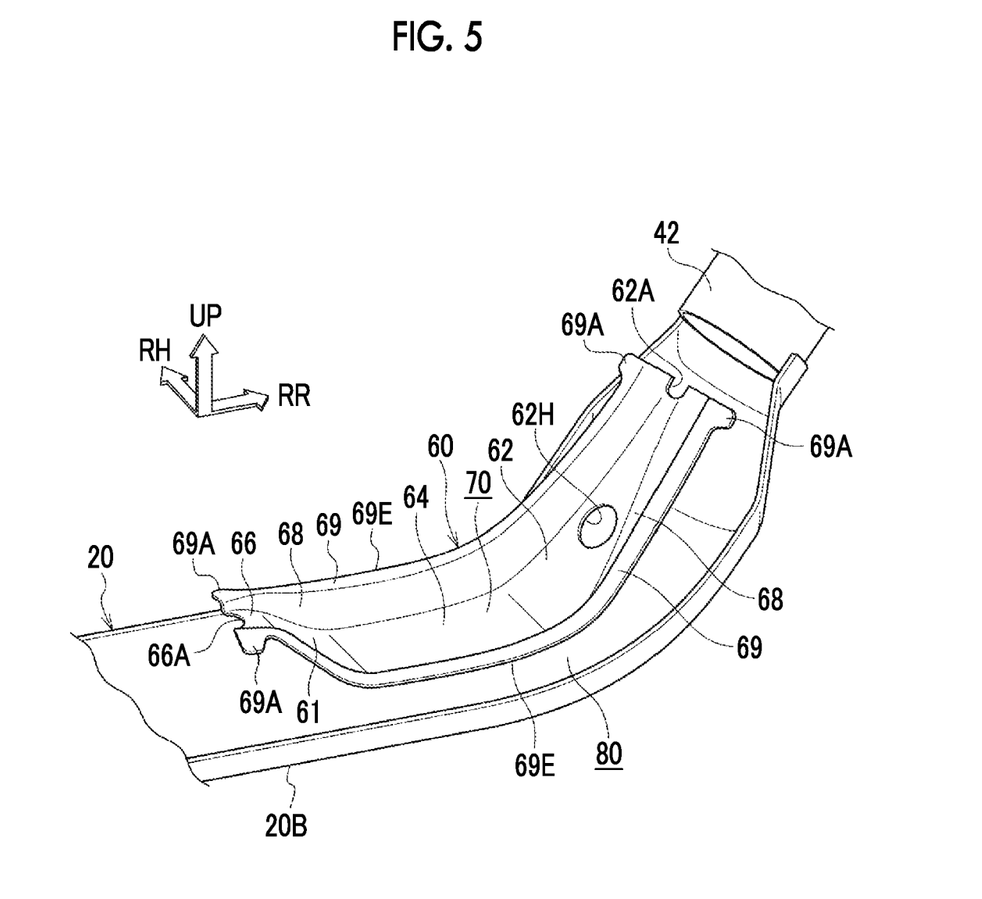
FIG. 5 is a perspective view illustrating the partition member according to the present embodiment.

As illustrated in FIG. 4 and FIG. 5, the partition member 60 is formed with one plate (panel). As illustrated in FIG. 3 and FIG. 6, the partition member 60 forms an upper side channel 70 and a lower side channel 80 by partitioning the inside of the extending portion 24 and the inside of the upslope portion 26 into an upper side and a lower side from the rear end portion 24R of the extending portion 24 to the front of the main muffler 40.

As illustrated in FIG. 4 and FIG. 5, specifically, the partition member 60 has a front portion 66, a first inclined portion 61, a bottom portion 64, a second inclined portion 62, a side portion 68, and a contact portion 69. As illustrated in FIG. 6, the front portion 66, the first inclined portion 61, the bottom portion 64, and the second inclined portion 62 are disposed in this order toward the downstream side of the second exhaust pipe 20. Accordingly, a region 96 in which the front portion 66 is disposed, a region 91 in which the first inclined portion 61 is disposed, a region 94 in which the bottom portion 64 is disposed, and a region 92 in which the second inclined portion 62 is disposed are formed in this order toward the downstream side of the second exhaust pipe 20 inside the second exhaust pipe 20. The regions 96, 91, 94, 92 are regions including the upper side channel 70 and the lower side channel 80 and are regions divided by double-dot chain lines inside the second exhaust pipe 20 in FIG. 6.

The side portion 68 is disposed on both sides of the front portion 66, the first inclined portion 61, the bottom portion 64, and the second inclined portion 62 in a width direction Y (one example of an orthogonal direction that is orthogonal with respect to an axial direction X of the second exhaust pipe 20). Each side portion 68 stands toward the vehicle upper side from the width-direction outer ends of the front portion 66, the first inclined portion 61, the bottom portion 64, and the second inclined portion 62. Each side portion 68 extends in the axial direction of the second exhaust pipe 20 and is formed in a band shape.

As illustrated in FIG. 4, the contact portion 69 is disposed on the width-direction outer side of each side portion 68. Each contact portion 69 extends outward in the width direction from the width-direction outer end of each side portion 68. Each contact portion 69 extends in the axial direction of the second exhaust pipe 20 and is formed in a band shape. An extending portion 69A that extends outward in the width direction is formed in the front end portion and the rear end portion of each contact portion 69.

Each contact portion 69 functions to be in contact with the inner wall of the upper portion (semi-cylinder 20A) of the second exhaust pipe 20. Specifically, each contact portion 69 including the extending portion 69A is in contact with the inner wall of the upper portion of the second exhaust pipe 20 in a position from the rear end portion 24R of the extending portion 24 to the front of the main muffler 40. In the state where each contact portion 69 is in contact with the inner wall of the second exhaust pipe 20, an outer periphery portion 69E of each contact portion 69 is joined to the second exhaust pipe 20 by welding or the like. The outer periphery portion 69E is joined in a range of, for example, a reference sign 693 to a reference sign 694 in FIG. 4.

As illustrated in FIG. 6, the bottom portion 64 is disposed from the rear end portion 24R of the extending portion 24 to the upslope portion 26. The bottom portion 64 faces a lower periphery 20F of the rear end portion 24R in the second exhaust pipe 20 and extends in the vehicle front-rear direction along the lower periphery 20F in the vehicle side view. In the vehicle side view, the bottom portion 64 is disposed in a position closer to the lower periphery 20F than an upper periphery 20E of the second exhaust pipe 20. The space between the bottom portion 64 and the lower periphery 20F is narrower than the space between the bottom portion 64 and the upper periphery 20E. Accordingly, the channel cross-sectional area of the lower side channel 80 is smaller than the upper side channel 70 in the region 94 where the bottom portion 64 is disposed in the second exhaust pipe 20.

As illustrated in FIG. 6, the first inclined portion 61 is disposed in the rear end portion 24R of the extending portion 24. As illustrated in FIG. 5 and FIG. 6, the first inclined portion 61 extends to the vehicle front side from the front end of the bottom portion 64. Specifically, the first inclined portion 61 has an upslope toward the vehicle front side from the bottom portion 64.

In the vehicle side view, the first inclined portion 61 becomes gradually closer to the upper periphery 20E of the second exhaust pipe 20 toward the vehicle front side, and the space between the first inclined portion 61 and the lower periphery 20F is gradually increased toward the vehicle front side. As illustrated in FIG. 4, a width W in the width direction Y (hereinafter, simply referred to as the width W) in the vehicle plan view is gradually decreased toward the vehicle front side in the first inclined portion 61. Accordingly, the width W of the upper side channel 70 is gradually decreased toward the vehicle front side in the first inclined portion 61.

Thus, the channel cross-sectional area of the upper side channel 70 is gradually decreased toward the vehicle front side in the region 91 where the first inclined portion 61 is disposed in the second exhaust pipe 20 (refer to FIG. 6). The region 91 in the second exhaust pipe 20 includes a downstream side part and an upstream side part. The downstream side part is where the channel cross-sectional area of the lower side channel 80 is smaller than the upper side channel 70. The upstream side part is where the channel cross-sectional area of the lower side channel 80 is greater than the upper side channel 70.

As illustrated in FIG. 6, the front portion 66 is disposed in the rear end portion 24R of the extending portion 24. The front portion 66 faces the upper periphery 20E of the rear end portion 24R in the second exhaust pipe 20 and extends forward of the vehicle from the front end of the first inclined portion 61 along the upper periphery 20E in the vehicle side view.

In the vehicle side view, the front portion 66 is disposed in a position closer to the upper periphery 20E than the lower periphery 20F. The space between the front portion 66 and the upper periphery 20E is narrower than the space between the front portion 66 and the lower periphery 20F. As illustrated in FIG. 4, the width W of the front portion 66 is approximately the same as the width W of the front end where the width W is the smallest in the first inclined portion 61, and is less than half of the width W of the second exhaust pipe 20.

Accordingly, the channel cross-sectional area of the lower side channel 80 is greater than the upper side channel 70 in the region 96 where the front portion 66 is disposed in the second exhaust pipe 20 (refer to FIG. 6).

As illustrated in FIG. 6, an inflow portion 72 that is opened to the vehicle front side and causes the exhaust gas to flow to the upper side channel 70 is formed above the front portion 66. The inflow portion 72 has the smallest channel cross-sectional area in the upper side channel 70 within the regions 96, 91, 94. As illustrated in FIG. 4 and FIG. 5, a cut portion 66A that causes a water drop to fall is formed at the front end of the front portion 66. Accordingly, blockage of the inflow portion 72 by a water drop is reduced.

As illustrated in FIG. 6, the second inclined portion 62 is disposed in the upslope portion 26. As illustrated in FIG. 5 and FIG. 6, the second inclined portion 62 extends to the vehicle rear side from the rear end of the bottom portion 64. Specifically, the second inclined portion 62 has an upslope toward the vehicle rear side from the bottom portion 64.

As illustrated in FIG. 6, in the vehicle side view, the second inclined portion 62 becomes gradually closer to the upper periphery 20E of the second exhaust pipe 20 toward the vehicle rear side, and the space between the second inclined portion 62 and the lower periphery 20F is gradually increased toward the vehicle rear side. As illustrated in FIG. 4, the width W of the second inclined portion 62 is gradually decreased toward the vehicle rear side. Accordingly, the width W of the upper side channel 70 is gradually decreased toward the vehicle rear side in the second inclined portion 62.

Thus, the channel cross-sectional area of the upper side channel 70 is gradually decreased toward the vehicle rear side in the region 92 where the second inclined portion 62 is disposed in the second exhaust pipe 20 (refer to FIG. 6). The region 92 in the second exhaust pipe 20 includes an upstream side part and a downstream side part. The upstream side part is where the channel cross-sectional area of the lower side channel 80 is smaller than the upper side channel 70. The downstream side part is where the channel cross-sectional area of the lower side channel 80 is greater than the upper side channel 70.

As illustrated in FIG. 6, an outflow portion 74 that is opened to the vehicle rear side and causes the exhaust gas to flow from the upper side channel 70 is formed above the rear end portion of the second inclined portion 62. The outflow portion 74 has the smallest channel cross-sectional area in the upper side channel 70 within the regions 94, 92. As illustrated in FIG. 4 and FIG. 5, a cut portion 62A that causes a water drop to fall is formed at the rear end of the second inclined portion 62. Accordingly, blockage of the outflow portion 74 by a water drop is reduced.

As illustrated in FIG. 4 and FIG. 5, a hole 62H that can cause water in the upper side channel 70 to flow to the lower side channel 80 is formed in the center portion, in the width direction Y, of the second inclined portion 62.

As illustrated in FIG. 4, the width W of the entirety of the partition member 60 in the upstream side part (front side part) including the front portion 66 and the first inclined portion 61 is smaller than the center part, in the front-rear direction (flow direction), of the partition member 60 including the bottom portion 64. The width W of the entirety of the partition member 60 is the smallest at the front end of the first inclined portion 61 in the partition member 60. The width W of the entirety of the partition member 60 in the downstream side part (rear side part) including the second inclined portion 62 is smaller than the center part, in the front-rear direction (flow direction), of the partition member 60 including the bottom portion 64.

Next, effects of the present embodiment will be described.

The exhaust gas discharged from the engine (not illustrated) of the vehicle is discharged to the atmosphere through the first exhaust pipe 11, the second exhaust pipe 20, the inlet pipe 42, the main muffler 40, and the outlet pipe 44 (refer to FIG. 2).

As illustrated in FIG. 6, in the exhaust mechanism 10, the partition member 60 forms the upper side channel 70 and the lower side channel 80 by partitioning the inside of the extending portion 24 and the inside of the upslope portion 26 into an upper side and a lower side from the rear end portion 24R of the extending portion 24 to the front of the main muffler 40.

The channel cross-sectional area of the lower side channel 80 is smaller than the upper side channel 70 in the region 94 (a region in a first aspect) where the bottom portion 64 disposed in the rear end portion 24R of the extending portion 24 is disposed. The channel cross-sectional area of the lower side channel 80 is greater than the upper side channel 70 in the region 96 in the second exhaust pipe 20, the upstream side part of the region 91, and the downstream side part of the region 92.

Accordingly, the channel cross-sectional area of the upper side channel 70 is greater than the channel cross-sectional area of the lower side channel 80 in the region 94 in the second exhaust pipe 20 and is smaller than the channel cross-sectional area of the lower side channel 80 in the region on the upstream side of the region 94 (the region 96 and the upstream side part of the region 91) and the region on the downstream side of the region 94 (the downstream side part of the region 92).

Thus, the exhaust gas from the engine is unlikely to flow into the upper side channel 70 and is guided to the lower side channel 80.

In the exhaust mechanism 10, the inflow portion 72 has the smallest channel cross-sectional area in the upper side channel 70 within the regions 96, 91, 94. The outflow portion 74 has the smallest channel cross-sectional area in the upper side channel 70 within the regions 94, 92. Particularly, the exhaust gas from the engine is unlikely to flow into the upper side channel 70 and is guided to the lower side channel 80.

For example, when water vapor included in the exhaust gas flowing in the second exhaust pipe 20 is condensed by a decrease in temperature or the like while flowing in the second exhaust pipe 20, the condensed water LW is generated within the second exhaust pipe 20, and the condensed water LW may pool in the extending portion 24 of the second exhaust pipe 20 as illustrated in FIG. 6.

Particularly, in the present embodiment, since the heat of the exhaust gas is collected by the exhaust heat collector 16 (refer to FIG. 2), the temperature of the exhaust gas is decreased, and the water vapor is likely to be condensed. In the present embodiment, since the rear end portion 24R of the extending portion 24 is a recessed part that is recessed downward below the front side part 24F, the condensed water LW is likely to pool in the rear end portion 24R.

When the condensed water LW pools within the lower side channel 80 in the rear end portion 24R of the extending portion 24, the cross-sectional area of the lower side channel 80 is decreased, and the flow rate of the exhaust gas guided to the lower side channel 80 is increased by Bernoulli's principle. In the exhaust mechanism 10, since the channel cross-sectional area of the lower side channel 80 is smaller than the upper side channel 70 in the rear end portion 24R of the extending portion 24, the flow rate of the exhaust gas guided to the lower side channel 80 is likely to be increased.

Figure 7:
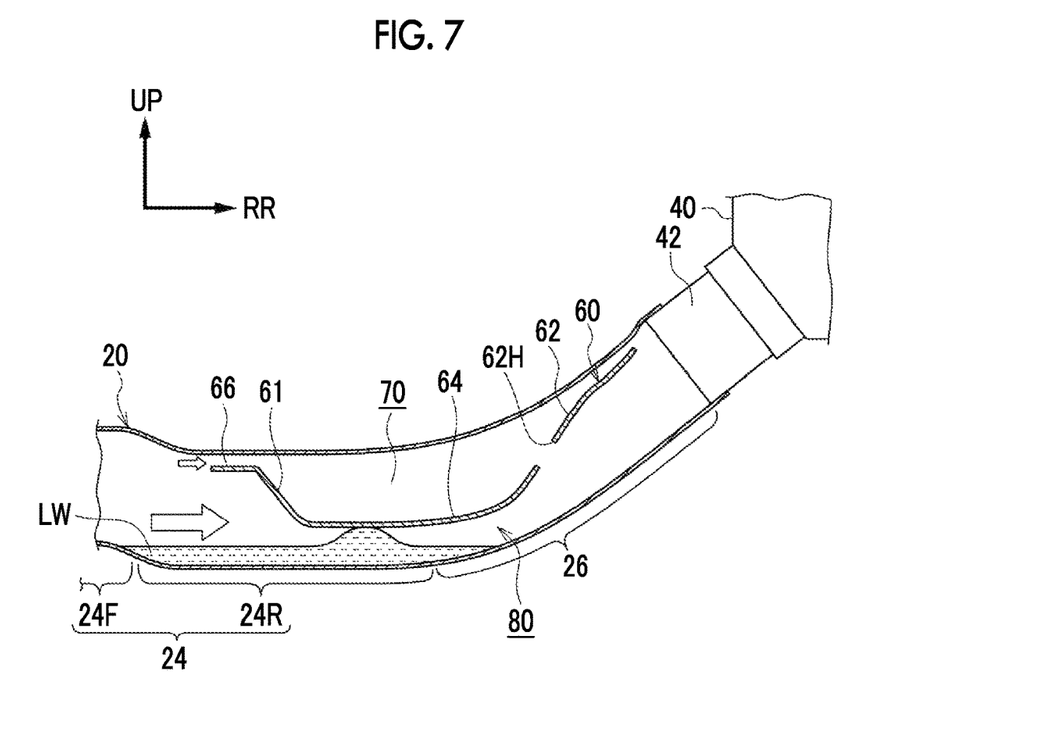
FIG. 7 is a side sectional view illustrating a state in which a water membrane of the condensed water is formed in the lower side channel in the exhaust mechanism according to the present embodiment.
Figure 8:
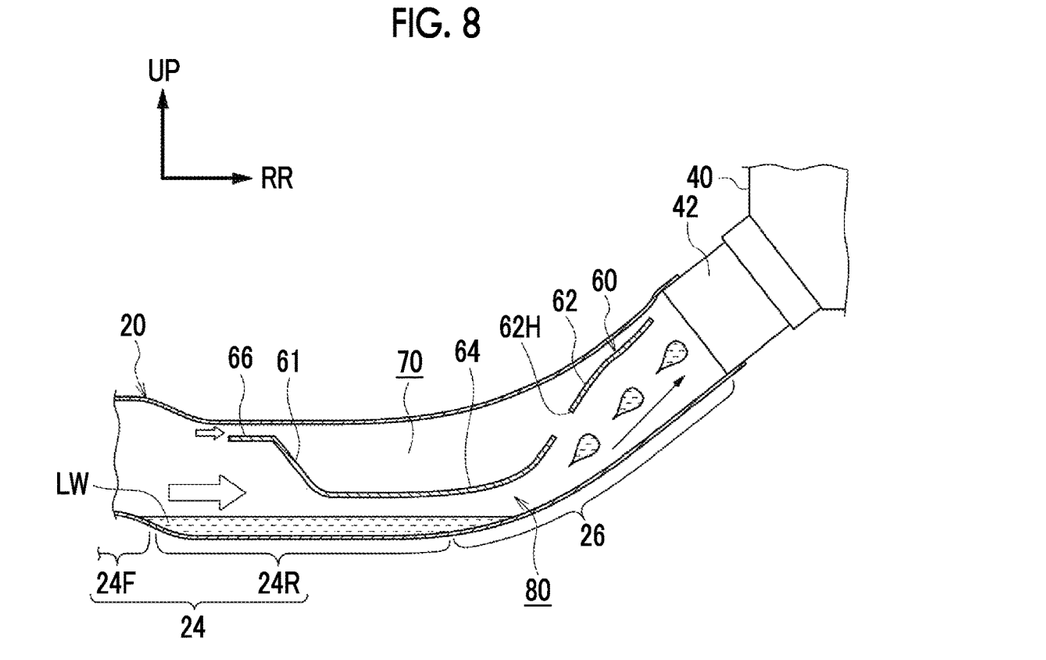
FIG. 8 is a side sectional view illustrating a state in which the condensed water pooling in the lower side channel is drained in the exhaust mechanism according to the present embodiment.

When the flow rate of the exhaust gas guided to the lower side channel 80 is increased, a negative pressure is generated within the lower side channel 80, and the surface of the condensed water LW rises as illustrated in FIG. 7. The rise in the surface of the condensed water LW forms a water membrane that closes the lower side channel 80, and the exhaust pressure of the exhaust gas is instantaneously increased. The increase in the exhaust pressure of the exhaust gas can drain the condensed water LW in the extending portion 24 along with the water membrane at once as illustrated in FIG. 8.

In the exhaust mechanism 10, the ability to drain the condensed water LW is improved by guiding the exhaust gas to the lower side channel 80 and facilitating an increase in the flow rate of the exhaust gas guided to the lower side channel 80.

In the exhaust mechanism 10, the exhaust gas flowing in the upper side channel 70 and the lower side channel 80 receives flow resistance from the partition member 60 from the extending portion 24 to the front of the main muffler 40. Accordingly, in the exhaust mechanism 10, the flow resistance is smaller than a structure in which the exhaust gas receives flow resistance from the partition member 60 in a path from the extending portion 24 to the inside of the main muffler 40 (refer to JP 2015-158149 A).

Accordingly, the exhaust mechanism 10 can improve the ability to drain the condensed water LW with reduction in pressure loss generated in the exhaust gas.

In the exhaust mechanism 10, the width W of the entirety of the partition member 60 in the upstream side part (front side part) including the front portion 66 and the first inclined portion 61 and the downstream side part (rear side part) including the second inclined portion 62 is smaller than the center part, in the front-rear direction (flow direction) of the partition member 60 including the bottom portion 64.

Forming the upper side channel 70 and the lower side channel 80 by partitioning the inside of the second exhaust pipe 20 with the partition member 60 having the width W set as above can set the width W of the upper side channel 70 to be smaller in the region on the upstream side of the region 94 (the region 96 and the region 91) and the region on the downstream side of the region 94 (the region 92).

Accordingly, a structure in which the channel cross-sectional area of the lower side channel 80 is smaller than the upper side channel 70 in the region 94 and is greater than the upper side channel 70 in the region 96, the upstream side part of the region 91, and the downstream side part of the region 92 in the second exhaust pipe 20 can be easily formed.

In the exhaust mechanism 10, since the bottom of the rear end portion 24R of the extending portion 24 is disposed in a position on the vehicle lower side from the bottom of the front side part 24F, the condensed water LW is likely to pool in the rear end portion 24R further than the front side part 24F. Thus, in the rear end portion 24R, the cross-sectional area of the lower side channel 80 is likely to be decreased, and the flow rate of the exhaust gas guided to the lower side channel 80 is likely to be increased. Accordingly, the ability to drain the condensed water LW can be improved.

In the exhaust mechanism 10, the exhaust gas flowing in the lower side channel 80 flows along the lower surface of the partition member 60. Since the first inclined portion 61 has an upslope toward the vehicle front side from the front end of the bottom portion 64, the exhaust gas flowing in the lower side channel 80 flows along the slope of the first inclined portion 61. Accordingly, the flow resistance received by the exhaust gas is reduced further than a structure having, instead of the first inclined portion 61, a standing portion that vertically stands upward of the vehicle from the front end of the bottom portion 64. The pressure loss generated in the exhaust gas can be reduced.

The exhaust gas flowing in the upper side channel 70 flows along the upper surface of the partition member 60. Since the second inclined portion 62 has an upslope toward the vehicle rear side from the rear end of the bottom portion 64, the exhaust gas flowing in the upper side channel 70 flows along the slope of the second inclined portion 62. Accordingly, the flow resistance received by the exhaust gas is reduced further than a structure having, instead of the second inclined portion 62, a standing portion that vertically stands upward of the vehicle from the rear end of the bottom portion 64. The pressure loss generated in the exhaust gas can be reduced.

Figure 9:
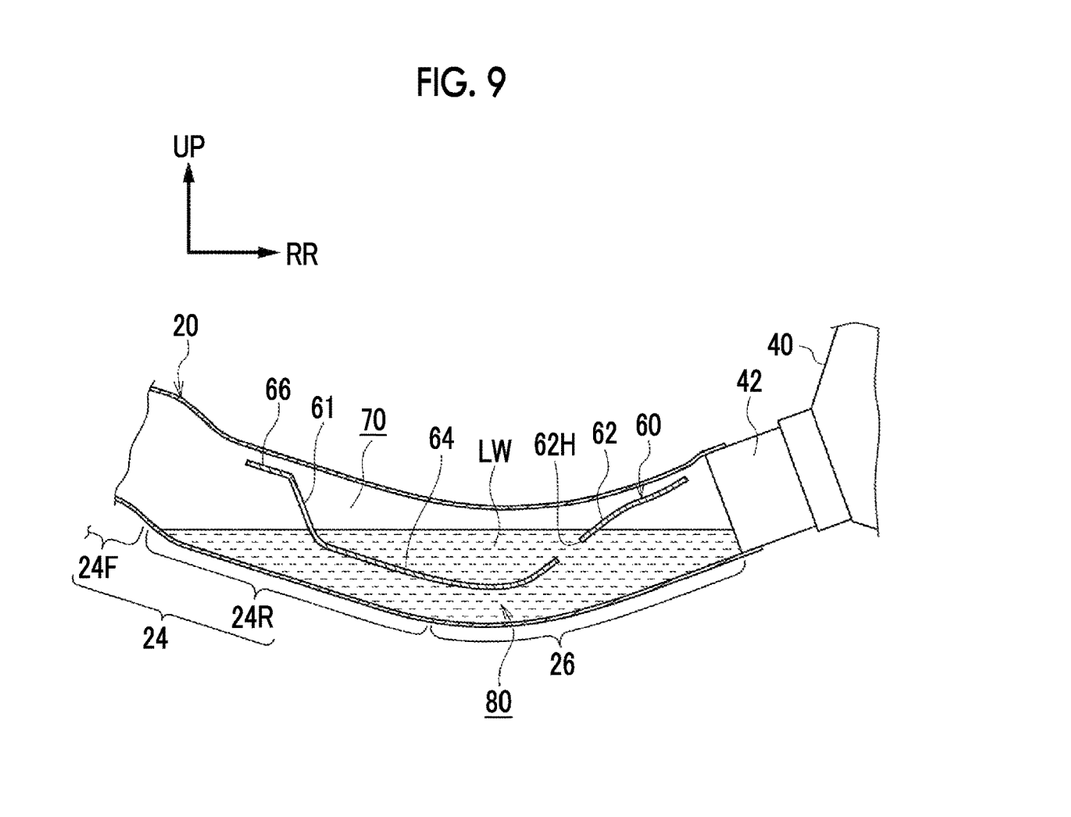
FIG. 9 is a side sectional view illustrating the exhaust mechanism according to the present embodiment when an attitude of a vehicle is backwardly inclined by parking on an inclined ground.

When the vehicle to which the exhaust mechanism 10 is applied is parked on an inclined ground and has a backwardly inclined attitude, the condensed water LW pooling in the second exhaust pipe 20 or the like gathers in the rear end portion 24R of the extending portion 24 as illustrated in FIG. 9. In the exhaust mechanism 10, since the inflow portion 72 is opened to the vehicle front side, the condensed water LW can also flow into the upper side channel 70 through the inflow portion 72. Thus, the capacity of retaining the condensed water LW can be secured further than a structure in which the upper side channel 70 is closed.

Figure 10:
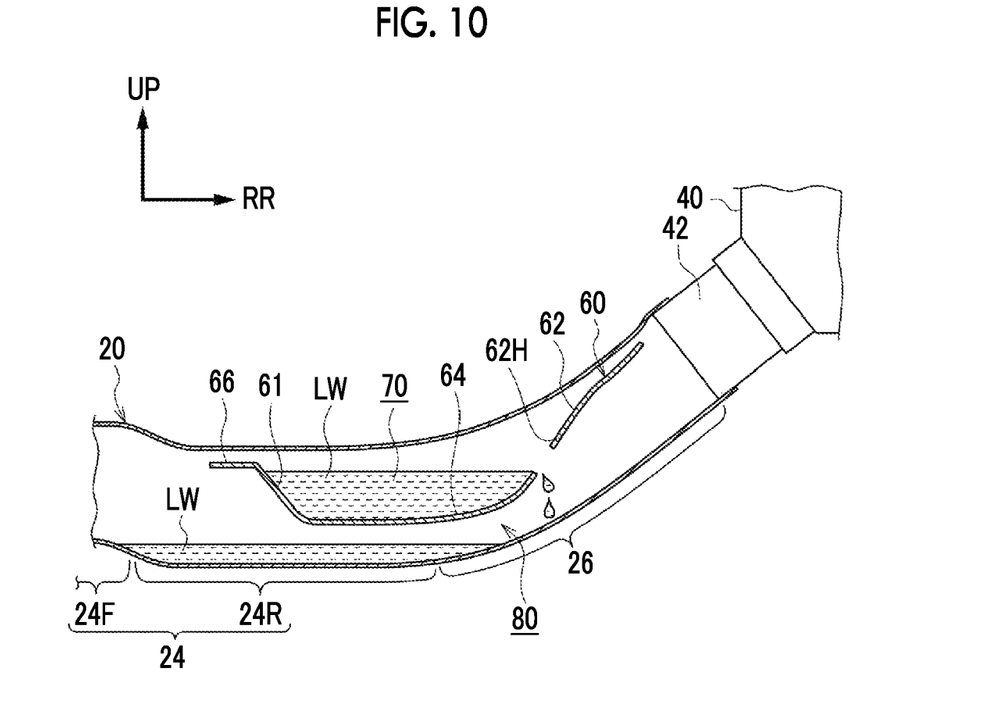
FIG. 10 is a side sectional view illustrating a state in which condensed water pooling in an upper side channel flows to the lower side channel in the exhaust mechanism according to the present embodiment.

In the exhaust mechanism 10, as illustrated in FIG. 10, since water in the upper side channel 70 can flow to the lower side channel 80 through the hole 62H formed in the second inclined portion 62, the condensed water LW is unlikely to pool in the upper side channel 70 even when the condensed water LW flows into the upper side channel 70.

Figure 11:
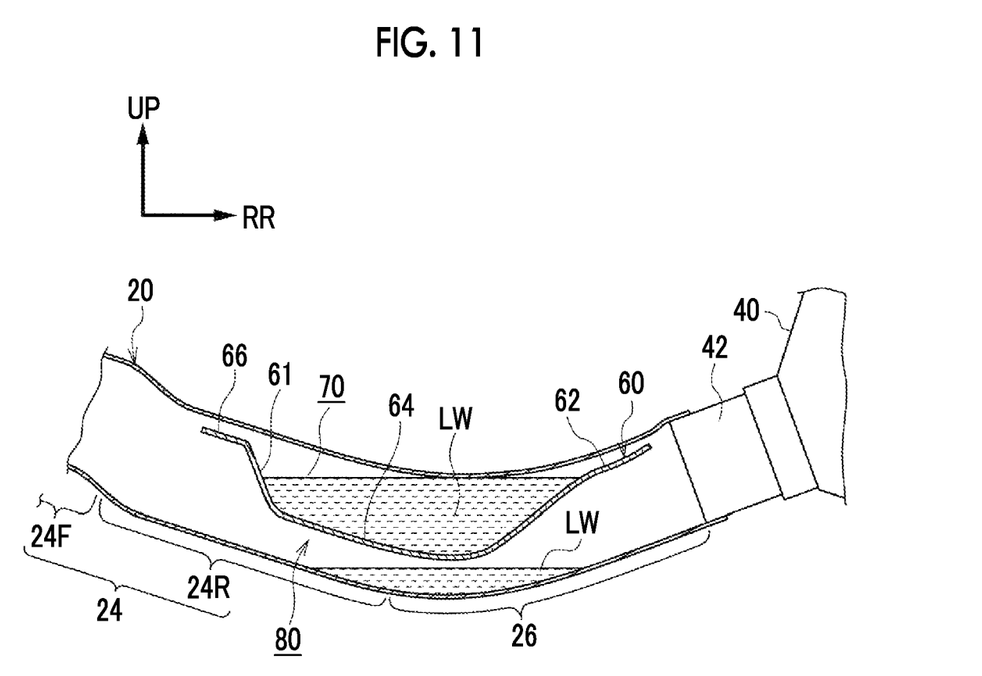
FIG. 11 is a side sectional view illustrating an exhaust mechanism according to a comparative example in which a hole that causes water in the upper side channel to flow to the lower side channel is not formed in the partition member.

For example, in a structure where the hole 62H is not formed in the second inclined portion 62, as illustrated in FIG. 11, the condensed water LW pooling in the upper side channel 70 (in the partition member 60) may freeze in a state where the condensed water LW is in contact with the upper periphery 20E of the second exhaust pipe 20, and the upper side channel 70 may be blocked.

In the exhaust mechanism 10, as illustrated in FIG. 10, even when the condensed water LW flows into the upper side channel 70, the condensed water LW in the upper side channel 70 flows to the lower side channel 80 and is unlikely to pool in the upper side channel 70. Thus, blockage of the upper side channel 70 by the condensed water LW is reduced.

The present disclosure is not limited to the embodiment. Various modifications, changes, and improvements can be made to the extent not departing from the gist of the present disclosure.

What is claimed is:

1. An exhaust mechanism for a vehicle, the mechanism comprising:
    an exhaust pipe that includes an extending portion and an upslope portion and is configured to cause exhaust gas from an engine to flow to a rear side of the vehicle, the extending portion extending in a front-rear direction of the vehicle, and the upslope portion communicating with one end of the extending portion on the rear side of the vehicle and having an upslope toward the rear side of the vehicle;
    a muffler that communicates with one end of the exhaust pipe on the rear side of the vehicle and is configured such that the exhaust gas flows into the muffler from the exhaust pipe; and
    a partition member that is disposed inside the extending portion and inside the upslope portion and partitions the inside of the extending portion and the inside of the upslope portion into an upper side and a lower side to provide an upper side channel and a lower side channel inside the extending portion and inside the upslope portion, the partition member being disposed such that a channel cross-sectional area of the lower side channel is smaller than a channel cross-sectional area of the upper side channel in a predetermined region of the extending portion and that the channel cross-sectional area of the lower side channel is greater than the channel cross-sectional area of the upper side channel on an upstream side of the predetermined region and a downstream side of the predetermined region.

2. The exhaust mechanism for the vehicle according to claim 1, wherein
    a first width is smaller than a second width, the first width is a width of the partition member on the upstream side of the predetermined region and the downstream side of the predetermined region, the second width is a width of the partition member in the predetermined region, the first width and the second width are widths in a width direction of the vehicle.

3. The exhaust mechanism for the vehicle according to claim 1, wherein
    a bottom of a rear end portion of the extending portion is disposed in a position on a lower side of the vehicle from a bottom of the extending portion on an upstream side of the rear end portion.

4. The exhaust mechanism for the vehicle according to claim 1, wherein
the partition member includes a bottom portion disposed in the extending portion, a first inclined portion having an upslope toward a front side of the vehicle from one end of the bottom portion on the front side of the vehicle, and a second inclined portion having an upslope toward the rear side of the vehicle from one end of the bottom portion on the rear side of the vehicle.

5. The exhaust mechanism for the vehicle according to claim 4, wherein
a hole that causes water in the upper side channel to flow to the lower side channel is formed in the second inclined portion.

6. The exhaust mechanism for the vehicle according to claim 1, wherein
the extending portion is disposed below a floor panel of the vehicle.

\* \* \* \* \*